(12) United States Patent
Lian et al.

(10) Patent No.: US 10,543,818 B2
(45) Date of Patent: Jan. 28, 2020

(54) STABILITY CONTROL SYSTEM AND METHOD FOR FOUR-WHEEL DRIVE ELECTRIC VEHICLE, AND ELECTRIC VEHICLE

(71) Applicant: BYD COMPANY LIMITED, Shenzhen, Guangdong (CN)

(72) Inventors: Yubo Lian, Shenzhen (CN); Heping Ling, Shenzhen (CN); Fanliang Meng, Shenzhen (CN); Yanfei Xiong, Shenzhen (CN); Mingchuan Shi, Shenzhen (CN)

(73) Assignee: BYD COMPANY LIMITED, Shenzhen, Guangdong (CN)

( * ) Notice: Subject to any disclaimer, the term of this patent is extended or adjusted under 35 U.S.C. 154(b) by 26 days.

(21) Appl. No.: 15/751,763

(22) PCT Filed: Aug. 10, 2016

(86) PCT No.: PCT/CN2016/094461
§ 371 (c)(1),
(2) Date: Feb. 9, 2018

(87) PCT Pub. No.: WO2017/025042
PCT Pub. Date: Feb. 16, 2017

(65) Prior Publication Data
US 2018/0236989 A1 Aug. 23, 2018

(30) Foreign Application Priority Data

Aug. 11, 2015 (CN) .......................... 2015 1 0487943

(51) Int. Cl.
*B60T 8/1755* (2006.01)
*G06F 19/00* (2018.01)
(Continued)

(52) U.S. Cl.
CPC ............ *B60T 8/17551* (2013.01); *B60L 7/18* (2013.01); *B60T 8/171* (2013.01); *B60T 8/172* (2013.01);
(Continued)

(58) Field of Classification Search
CPC .......... B60T 8/1755; B60T 8/60; B60L 15/20; B60G 17/06; B60W 30/02; B60D 6/02;
(Continued)

(56) References Cited

U.S. PATENT DOCUMENTS

| 8,712,639 B2 * | 4/2014 | Lu ...................... B60G 17/0195 |
| | | 701/36 |
| 2003/0163237 A1 * | 8/2003 | Kim ...................... B60T 8/1755 |
| | | 701/70 |

(Continued)

FOREIGN PATENT DOCUMENTS

| CN | 1439556 A | 9/2003 |
| CN | 1946586 A | 4/2007 |

(Continued)

OTHER PUBLICATIONS

English Translation of International Search Report from PCT/CN2016/094461 dated Oct. 31, 2016 (2 pages).

*Primary Examiner* — Yuri Kan
(74) *Attorney, Agent, or Firm* — Calfee, Halter & Griswold LLP

(57) ABSTRACT

The embodiments of the present application disclose a stability control system and a stability control method for a four-wheel drive electric vehicle and the four-wheel drive electric vehicle. In the stability control system, when the lateral acceleration is equal to or greater than an acceleration threshold, at least one of a first braking force signal, a second braking force signal, a first logic signal and a second logic signal is obtained. When the first logic signal is obtained, the (Continued)

body of the electric vehicle is controlled to keep stable. When the first braking force signal and the second logic signal are obtained, a motor is controlled to apply braking force to an outside front wheel. When the second braking force signal and the second logic signal are obtained, motors are controlled to apply braking force to the outside front wheel and an inside rear wheel.

20 Claims, 6 Drawing Sheets

(51) Int. Cl.
| | | |
|---|---|---|
| *B60L 15/20* | (2006.01) | |
| *B62D 6/00* | (2006.01) | |
| *B60T 8/60* | (2006.01) | |
| *B60L 7/18* | (2006.01) | |
| *B60T 8/171* | (2006.01) | |
| *B60T 8/172* | (2006.01) | |
| *B60T 8/30* | (2006.01) | |
| *B60T 8/32* | (2006.01) | |
| *B60T 13/74* | (2006.01) | |

(52) U.S. Cl.
CPC ............ *B60T 8/17552* (2013.01); *B60T 8/30* (2013.01); *B60T 8/3205* (2013.01); *B60T 13/741* (2013.01); *B60L 2240/16* (2013.01); *B60L 2240/18* (2013.01); *B60L 2240/22* (2013.01); *B60L 2240/24* (2013.01); *B60T 2270/302* (2013.01); *B60T 2270/613* (2013.01)

(58) Field of Classification Search
CPC .. B60D 6/00; G06F 19/00; G06F 7/00; B62D 6/00
See application file for complete search history.

(56) References Cited

U.S. PATENT DOCUMENTS

| | | | |
|---|---|---|---|
| 2005/0017578 A1* | 1/2005 | Kato | B60T 8/17554 303/146 |
| 2007/0260388 A1* | 11/2007 | Watanabe | B60K 23/0808 701/70 |
| 2008/0086248 A1* | 4/2008 | Lu | B60T 8/171 701/41 |
| 2011/0166744 A1* | 7/2011 | Lu | B60T 8/1755 701/29.2 |
| 2011/0241299 A1* | 10/2011 | Harada | B60T 8/1755 280/5.513 |
| 2011/0307129 A1 | 12/2011 | Hai et al. | |
| 2013/0103263 A1* | 4/2013 | Hsu | B62D 6/003 701/42 |
| 2014/0257613 A1* | 9/2014 | Tang | B60L 15/2036 701/22 |

FOREIGN PATENT DOCUMENTS

| | | |
|---|---|---|
| CN | 1966320 A | 5/2007 |
| CN | 103182956 A | 7/2013 |
| CN | 104044585 A | 9/2014 |
| CN | 104080672 A | 10/2014 |
| CN | 104773169 A | 7/2015 |
| EP | 2623386 A1 | 8/2013 |
| JP | 03143757 A | 6/1991 |
| JP | 2005153716 A | 6/2005 |
| WO | 2009077835 A1 | 6/2009 |

\* cited by examiner

STABILITY CONTROL SYSTEM AND METHOD FOR FOUR-WHEEL DRIVE ELECTRIC VEHICLE, AND ELECTRIC VEHICLE

CROSS REFERENCE TO RELATED APPLICATION

The present application is based on International Application No. PCT/CN2016/094461, filed on Aug. 10, 2016, which claims the priority of Chinese Application No. 201510487943.6, filed on Aug. 11, 2015, the entire contents of which are herein incorporated by reference.

FIELD OF THE INVENTION

The present application relates to the field of vehicles, and more specifically, relates to a stability control system for a four-wheel drive electric vehicle, a stability control method for a four-wheel drive electric vehicle and a four-wheel drive electric vehicle.

BACKGROUND ART

With the improvement of people's living standards, vehicles are widely used as travel tools. Thus, the driving safety of the vehicles cannot be ignored. For example, in the normal driving process of a vehicle, if the vehicle suddenly avoids an obstacle ahead or the driver suddenly turns the steering wheel, the vehicle will be prone to a rollover accident.

SUMMARY OF THE INVENTION

The present application is aimed at solving one of the technical problems in the prior art.

Thus, the present application provides a stability control system for a four-wheel drive electric vehicle, a stability control method for a four-wheel drive electric vehicle and a four-wheel drive electric vehicle.

A stability control system for a four-wheel drive electric vehicle includes a vehicle controller and a signal detection sensor, in which the vehicle controller includes a first stability control unit and a second stability control unit; the signal detection sensor is configured to detect lateral acceleration signals; the first stability control unit is configured to judge whether the lateral acceleration is less than a preset acceleration threshold, and continue to judge whether the lateral acceleration is less than the acceleration threshold when the lateral acceleration is less than the acceleration threshold; the first stability control unit is further configured to calculate a lateral load transfer ratio according to the lateral acceleration signals when the lateral acceleration is equal to or greater than the acceleration threshold, and to determine the state of the vehicle according to the lateral load transfer ratio to obtain at least one of a first braking force signal, a second braking force signal, a first logic signal and a second logic signal; the second stability control unit is configured to control the body of the electric vehicle to keep stable when obtaining the first logic signal; the first stability control unit is further configured to control a motor of the electric vehicle via a motor controller of the electric vehicle to apply braking force to an outside front wheel of the electric vehicle when obtaining the first braking force signal and the second logic signal; and the first stability control unit is further configured to control motors of the electric vehicle via motor controllers of the electric vehicle to apply braking force to the outside front wheel of the electric vehicle and an inside rear wheel of the electric vehicle when obtaining the second braking force signal and the second logic signal.

A stability control method for a four-wheel drive electric vehicle includes the steps of: detecting lateral acceleration signals; judging whether the lateral acceleration is less than a preset acceleration threshold; executing the step of judging whether the lateral acceleration is less than the preset acceleration threshold when the lateral acceleration is less than the acceleration threshold; calculating a lateral load transfer ratio according to the lateral acceleration signals, and judging the state of the vehicle according to the lateral load transfer ratio to obtain at least one of a first braking force signal, a second braking force signal, a first logic signal and a second logic signal when the lateral acceleration is equal to or greater than the acceleration threshold; controlling the body of the electric vehicle to keep stable when the first logic signal is obtained; controlling a motor of the electric vehicle to apply braking force to an outside front wheel of the electric vehicle when the first braking force signal and the second logic signal are obtained; and controlling motors of the electric vehicle to apply braking force to the outside front wheel of the electric vehicle and an inside rear wheel of the electric vehicle when the second braking force signal and the second logic signal are obtained.

A four-wheel drive electric vehicle includes the stability control system for the four-wheel drive electric vehicle as mentioned in the above embodiment; motor controllers; and motors, wherein the motor controllers are connected with the motors and the stability control system respectively.

According to the above technical solution, the first stability control unit takes corresponding vehicle stable-keeping measures according to different states of the vehicle, particularly, when the vehicle has a rollover trend or risk, the first stability control unit can apply braking force to the outside front wheel of the vehicle via the motor, or apply braking force to the outside front wheel and the inside rear wheel of the vehicle, to keep the body stable.

The additional aspects and advantages of the present application will be given partially in the following description, part of them will become obvious from the following description, or be learnt via the practice of the present application.

BRIEF DESCRIPTION OF THE DRAWINGS

The above-mentioned and/or additional aspects and advantages of the present application will become obvious and be easily understood from the description of embodiments in combination with the following accompanying drawings, in which.

DETAILED DESCRIPTION OF THE EMBODIMENTS

Figure 1:
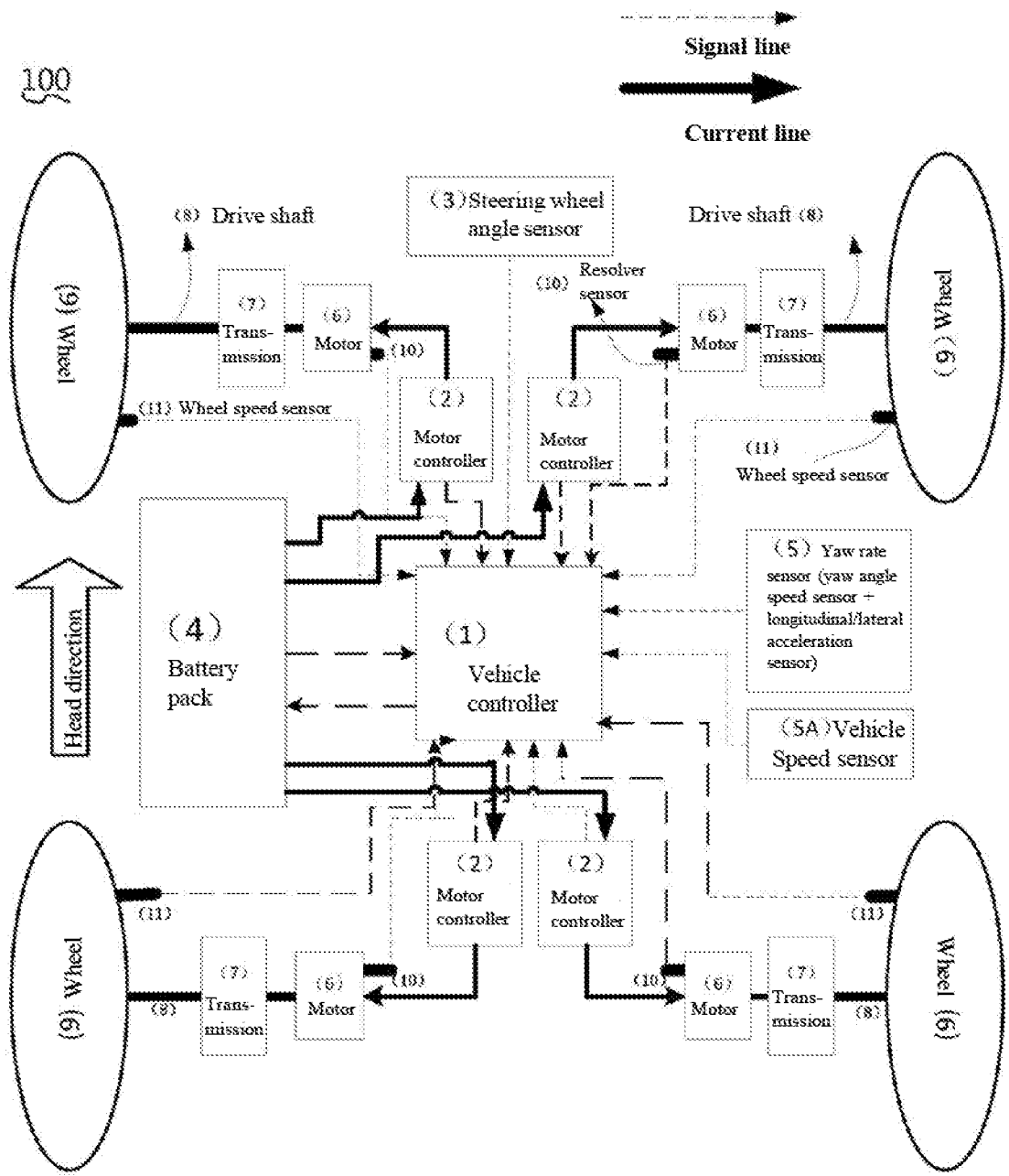
FIG. 1 is a schematic diagram of a stability control system for a four-wheel drive electric vehicle according to the embodiment of the present application.

The embodiments of the present application will be described in detail below, and the examples of the embodiments are shown in the accompanying drawings, wherein the same or like reference numbers throughout refer to the same or like elements or the elements having same or similar functions. The embodiments described below by referring to the drawings are exemplary, and are merely used for interpreting the present application, rather than limiting the present application.

In the description of the present application, it should be noted, unless otherwise specified and defined, the terms "installation" and "connection" should be understood broadly, for example, the "connection" may be fixed connection, detachable connection, or integral connection; the "connection" may be mechanical connection, electrical connection, or mutual communication; the "connection" may be direct connection, or indirect connection via a medium, and the "connection" may be communication of interiors of two elements or interaction of two elements. For the ordinary skilled persons in the art, the specific meanings of said terms in the present application can be understood according to specific circumstances.

The disclosure of the following description provides many different embodiments or examples for realizing different structures of the present application. In order to simplify the disclosure of the present application, described below are components and settings of specific examples. Of course, they are only examples, and are not aimed at limiting the present application. Moreover, the present application can repeat reference numbers and/or reference letters in different examples, but such repetition is for the sake of simplification and clearness, and it does not indicate the relation between various embodiments and/or settings discussed. Furthermore, the present application provides the examples of various specific processes and materials, but the ordinary skilled persons in the art could conceive of application of other processes and/or usage of other materials.

In the embodiments of the present application, in order to improve the anti-rollover ability of a vehicle and further improve the active safety of the vehicle, the existing common anti-rollover methods that can effectively improve the vehicle stability include a differential braking control technology, an active/semi-active suspension control technology, an active roll stabilizer technology, an active steering technology, an active brake, etc. In practice, each method has certain limitation, for example, a differential torsion braking control largely depends on the vertical load of the outside wheel, and when the wheel is going to leave the ground, only braking on the outside wheel is difficult in playing an effective role; the active suspension control technology and the active roll stabilizer can improve the rollover threshold value and suppress the rollover of the vehicle, but cannot meet the quick response requirement of anti-rollover; and a large-angle steering control may change the expected driving track of the vehicle, thus causing the problem of insufficient steering of the vehicle.

In addition, with the development of new energy for vehicles, independent four-wheel drive electric vehicles have come out. Because the independent four-wheel drive electric vehicle uses four motors to control the four wheels independently, and the motors response quickly (about 20 milliseconds), which has great advantages over the traditional hydraulic braking response time (about 200 milliseconds), how to use the independent four-wheel drive electric vehicle as the stability control means becomes a problem to be solved urgently.

Referring to FIG. 1, an embodiment of the present application provides a stability control system 100 for a four-wheel drive electric vehicle (hereinafter referred to as a stability control system). The stability control system 100 is applicable to a four-wheel independently-drive electric vehicle. The electric vehicle may include four motor controllers 2, four motors 6 and a battery pack 4. Each motor controller 2 can separately control the corresponding motor 6. Each motor 6 is used for controlling a corresponding wheel 9 to run, e.g., producing driving force or braking force for the wheel 9. In this embodiment, the motor 6 may be a wheel side motor, and the wheel side motor is connected to the corresponding wheel 9 via a transmission 7 and a drive shaft 8. In other embodiments, the motor 6 may be an in-wheel motor, in this case, the transmission 7 can be omitted from the electric vehicle, which is beneficial to the layout of the vehicle component. The battery pack 4 is connected with the motor controllers 2 via high voltage wires.

The stability control system 100 includes a vehicle controller 1 and a signal detection sensor (not shown in the figure). The vehicle controller 1 is responsible for controlling the operation of the electric vehicle. In this embodiment, the vehicle controller 1 includes a first stability control unit (not shown in the figure) and a second stability control unit (not shown in the figure). The first stability control unit, the second stability control unit, the signal detection sensor and the motor controllers 2 can communicate with each other via a CAN (Controller Area Network) bus of the vehicle. The second stability control unit may be an electronic body stability control unit of the vehicle. The battery pack 4 communicates with the vehicle controller 1.

The signal detection sensor is used for detecting lateral acceleration signals. In the embodiments, the signal detection sensor is further used for detecting wheel speed signals, vehicle speed signals, steering wheel angle signals, yaw angle speed signals and longitudinal acceleration signals.

In an embodiment, the signal detection sensor includes wheel speed sensors 11, a vehicle speed sensor 5A, a steering wheel angle sensor 3 and a yaw rate sensor 5. The wheel speed sensors 11 are used for detecting the wheel speed signals. The vehicle speed sensor 5A is used for detecting the vehicle speed signals. The steering wheel angle sensor 3 is used for detecting the steering wheel angle signals.

The yaw rate sensor 5 includes a longitudinal acceleration sensor, a lateral acceleration sensor and a yaw angle speed sensor. The yaw angle speed sensor is used for detecting the yaw angle speed signals. The longitudinal acceleration sensor is used for detecting the longitudinal acceleration signals. The lateral acceleration sensor is used for detecting the lateral acceleration signals. It could be understood that the longitudinal acceleration sensor, the lateral acceleration sensor and the yaw angle speed sensor can be integrated together.

The first stability control unit is used for judging whether the lateral acceleration is less than a preset acceleration threshold. For example, the preset acceleration threshold can be set to 0.4 g, in which g is gravitational acceleration.

When judging that the lateral acceleration is less than the acceleration threshold, the first stability control unit is used for continuously judging whether the lateral acceleration is less than the acceleration threshold.

When judging that the lateral acceleration is greater than or equal to the acceleration threshold, the first stability control unit is used for calculating a lateral load transfer ratio based on the lateral acceleration signals, and judging the state of the vehicle based on the lateral load transfer ratio to obtain at least one of a first braking force signal, a second braking force signal, a first logic signal and a second logic signal.

The second stability control unit is used to control the body of the electric vehicle to keep stable when obtaining the first logic signal.

The first stability control unit is further used to control the motor of the electric vehicle via the motor controller of the electric vehicle to apply braking force to the outside front wheel of the electric vehicle when obtaining the first braking force signal and the second logic signal.

The first stability control unit is further used for controlling the motors of the electric vehicle via the motor controllers of the electric vehicle to apply braking force to the outside front wheel of the electric vehicle and the inside rear wheel of the electric vehicle when obtaining the second braking force signal and the second logic signal.

That is to say, the first stability control unit judges that the electric vehicle has a first trend when obtaining the first logic signal. At the moment, the first stability control unit outputs the first logic signal to the second stability control unit. The second stability control unit is used for controlling the body of the electric vehicle to keep stable according to the first logic signal.

The first stability control unit judges that the electric vehicle has a second trend. At the moment, the second stability control unit obtains the second logic signal, but does not output control when obtaining the first braking force signal and the second logic signal.

The first stability control unit judges that the electric vehicle has a third trend. At the moment, the second stability control unit obtains the second logic signal, but does not output control when obtaining the second braking force signal and the second logic signal.

If the electric vehicle has the first trend, the second stability control unit is used for controlling the body of the electric vehicle to keep stable.

If the electric vehicle has the second trend, the first stability control unit is used for controlling the motor via the motor controller to apply braking force to the outside front wheel of the electric vehicle. For example, under this circumstance, the first stability control unit can generate a first braking force signal and send the first braking force signal to the motor controller, and the motor controller controls the motor according to the first braking force signal to apply braking force to the outside front wheel of the electric vehicle.

If the electric vehicle has the third trend, the first stability control unit is used for controlling the motors via the motor controllers to apply braking force to the outside front wheel of the electric vehicle and the inside rear wheel of the electric vehicle. For example, under this circumstance, the first stability control unit can generate a second braking force signal and send the second braking force signal to the motor controllers, and the motor controllers control the motors according to the second braking force signal to apply braking force to the outside front wheel of the electric vehicle and the inside rear wheel of the electric vehicle.

For example, referring to FIG. 1, if the vehicle turns left of FIG. 1, the outside wheels are right wheels 9, the inside wheels are left wheels 9, the outside front wheel is the upper right wheel 9, and the inside rear wheel is the lower left wheel 9. If the vehicle turns right of FIG. 1, the outside wheels are left wheels 9, the inside wheels are right wheels 9, the outside front wheel is the upper left wheel 9, and the inside rear wheel is the lower right wheel 9.

In an embodiment, a first transfer ratio threshold, a second transfer ratio threshold and a third transfer ratio threshold are preset in the first stability control unit. The first transfer ratio threshold is greater than zero, the second transfer ratio threshold is greater than the first transfer ratio threshold, and the third transfer ratio threshold is greater than the second transfer ratio threshold and less than 1.

When $|LTR|<L1$, the first stability control unit obtains the first logic signal to determine that the electric vehicle has the first trend, e.g., the electric vehicle has a sideslip trend.

When $L1 \leq |LTR| < L2$, the first stability control unit obtains the first braking force signal and the second logic signal to determine that the electric vehicle has the second trend, e.g., the electric vehicle has a rollover trend.

When $L2 \leq |LTR| \leq L3$, the first stability control unit obtains the second braking force signal and the second logic signal to determine that the electric vehicle has the third trend, e.g., the electric vehicle has a rollover risk.

In which, LTR indicates the lateral load transfer ratio, $|LTR|$ indicates the absolute value of the lateral load transfer ratio, L1 indicates the first transfer ratio threshold, L2 indicates the second transfer ratio threshold, and L3 indicates the third transfer ratio threshold.

In an embodiment, for example, L1=0.5, L2=0.6, and L3=0.9, in which the limit value L3 of the lateral load transfer ratio is set as 0.9 in order to ensure the driving safety of the vehicle.

Thus, at the first stage of stability control of the stability control system, i.e., when $|LTR|<L1$, the electric vehicle has the sideslip trend, the second stability control unit controls the body of the electric vehicle to keep stable, e.g., the second stability control unit can brake the corresponding wheel 9 by controlling a brake execution mechanism (not shown in the figure) of the electric vehicle, thereby reducing sideslip so as to keep the body of the electric vehicle stable. For example, the brake execution mechanism includes a brake master cylinder, a wheel cylinder, a brake disc and brake calipers. The brake disc is mounted on the hub and rotates together with the wheel 9. When the brake pedal is pressed down, the push rod connected with the brake pedal and the brake master cylinder propels the brake master cylinder to produce hydraulic pressure. The hydraulic pressure produced by the brake master cylinder is transferred to the wheel cylinder, and the wheel cylinder applies pressure to the brake calipers to produce friction on the brake disc, thus braking the corresponding wheel 9.

The second stability control unit controls the brake extraction mechanism to brake the corresponding wheel 9, e.g., when the electric vehicle has a sideslip trend while turning left, the second stability control unit is used for controlling the brake calipers corresponding to the inside rear wheel 9 to brake the inside rear wheel 9; and when the electric vehicle has a sideslip trend while turning right, the second stability control unit is used for controlling the brake calipers corresponding to the outside front wheel 9 to brake the outside front wheel 9.

At the second stage of stability control of the stability control system, i.e., when L1≤|LTR|<L2, the first stability control unit executes a regenerative braking mode on the outside wheels by using the wheel side motors 6. An additional yaw torque is generated to reduce the yaw angle speed of the electric vehicle. Meanwhile, the braking force is increased to reduce the longitudinal speed of the electric vehicle. At the tire adhesion limit, the tire force is generally saturated, and due to the nonlinearity of tires, it can be known from the adhesion ellipse of the electric vehicle that when the longitudinal force (braking force) is increased, the lateral force (braking force) of the ground applying to the wheels is correspondingly reduced, so that the lateral speed is also reduced. Thus, the lateral acceleration is reduced, and the rollover can be prevented. The regenerative braking means that the motors 6 are no longer drive motors but generators, the wheels 9 drive the motors 6 to generate power, rotors of the motors cut magnetic induction lines of the stators to generate reverse resistance to hinder rotation of the wheels 9 so as to achieve the effect of deceleration, and at the same time, the motors 6 generate recoverable electrical energy. Further, the vehicle controller 1 is used for storing the electrical energy generated by the motors 6 into the battery pack 4.

At the third stage of stability control of the stability control system, i.e., when L2≤|LTR|≤L3, the lateral load transfer ratio is relatively large (generally caused by turning the steering wheel at a high speed or by lateral wind). At the moment, left and right wheel loads of the electric vehicle are seriously transferred. If the outside wheels provide corresponding yaw torques insufficiently, the wheel side motors 6 assist the inside wheels in regenerative braking while executing the regenerative braking on the outside wheels. The magnitudes of the regenerative braking torques of the inside and outside wheels are distributed in real time according to the status of the vehicle, and the distribution principle is as followed: at the road adhesion limit, the tire force is generally saturated, and due to the nonlinearity of tires, it can be known from the adhesion ellipse of the electric vehicle that when the longitudinal force (braking force) is increased, the lateral force is correspondingly reduced. However, the directions of yaw torques produced by longitudinal and lateral force changes of each wheel on the electric vehicle are different. Table 1 shows the statistical result of braking each wheel under certain turning angle, in which "+" indicates that the yaw torque produced by the wheel is consistent with the desired moving direction of the vehicle, on the contrary, "−" indicates that the yaw torque produced by the wheel is opposite to the desired moving direction of the vehicle.

As shown in table 1, only when the outside front wheel and the inside rear wheel are braked, the yaw torques produced by longitudinal and lateral force changes are in the same direction. Thus, during the second stage and the third stage, the first stability control unit mainly executes braking interference to the outside front wheel or to the outside front wheel and the inside rear wheel, so that more reasonable and enough additional yaw torque is produced, the yaw angle speed and the lateral acceleration are reduced, the rollover posture of the body is corrected, and the vehicle quickly reaches a stable state. The additional yaw torque is the yaw torque produced by the outside front wheel, or the sum of the yaw torque produced by the outside front wheel and the yaw torque produced by the inside rear wheel.

Table 1 shows the statistical result of braking each wheel under certain turning angle, in which ΔM1, ΔM2, ΔM3 and ΔM4 are yaw torques produced by the four wheels to the vehicle when the wheels are braked.

TABLE 1

| Tire force | Yaw torques | | | |
| --- | --- | --- | --- | --- |
| | Inside front wheel | Outside front wheel | Inside rear wheel | Outside rear wheel |
| Braking force increase | +ΔM1 | −ΔM2 | +ΔM3 | −ΔM4 |
| Lateral force decrease | −ΔM2 | −ΔM2 | +ΔM3 | +ΔM4 |

Thus, the stability control system 100 adopts the lateral load transfer ratio and the lateral acceleration as control objectives of electric vehicle stability. The lateral load transfer ratio (LTR) is defined as a ratio of the vertical load difference of the left and right tires to the total vertical load of the whole vehicle, namely $$LTR = \frac{F_L - F_R}{F_L + F_R};$$

$F_L$ indicates vertical load borne by the left tires including the left front wheel and the left rear wheel, and $F_R$ indicates vertical load borne by the right tires including the right front wheel and the right rear wheel.

It could be understood that the states of the electric vehicle corresponding to said first, second and third trends can be adjusted according to actual situations.

When the electric vehicle rolls over, the vertical loads of the left and right tires are transferred, that is, the value range of LTR is [−1,1]. When LTR=0, the electric vehicle does not roll over; when 0<LTR<1 or −1<LTR<0, the electric vehicle rolls over partially; and when LTR=±1, the tires on one side leave the ground, and a rollover risk happens. The lateral load transfer ratio is not easy to measure directly, so it can be indirectly measured by linear transformation on the LTR indicator based on the built vehicle model.

The stability control system 100 monitors the lateral acceleration of the electric vehicle in real time via the lateral acceleration sensor, the vertical load of each wheel is calculated based on vehicle parameters, and a lateral load transfer ratio algorithm formula $$LTR = \frac{F_L - F_R}{F_L + F_R}$$

is pre-compiled to the first stability control unit.

The additional yaw torque can be obtained by comparing the actual lateral load transfer ratio LTR with the ideal lateral load transfer ratio LTRd, and then by calculating through the vehicle model and certain control algorithm. The additional yaw torque refers to a torque produced by applying additional braking force to one or more wheels based on an additional torque value $M_{RSC}$ calculated by the vehicle model in order to maintain the body stable and prevent rollover. The ideal lateral load transfer ratio, namely the preset lateral load transfer ratio, is a rollover warning threshold artificially set in the first stability control unit, e.g., a value less than said first transfer ratio threshold.

Figure 2:
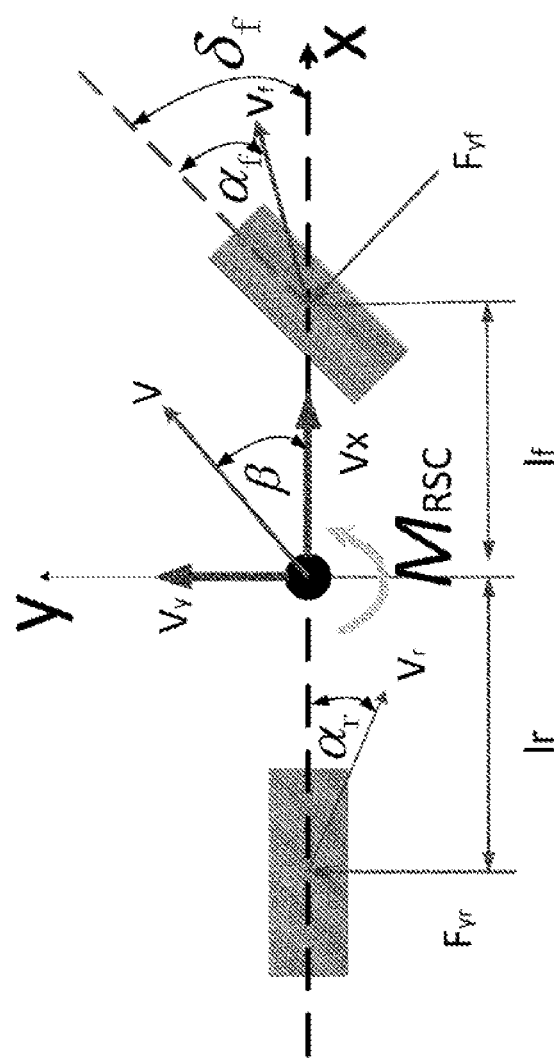
FIG. 2 shows a schematic diagram of a two-degree-of-freedom (2-DOF) linear model of the vehicle according the embodiment of the present application.

Referring next to FIG. 2, the additional yaw torque $M_{RSC}$ will be calculated by using a 2-DOF linear model and a sliding mode variable structure control algorithm as an example. It should be pointed out, the additional yaw torque $M_{RSC}$ can also be calculated via other known algorithm, e.g., "Vehicle Dynamics" of Tsinghua University Press, "Vehicle Dynamics and Control" of Mechanical Industry Press, doctoral thesis "Study on Vehicle Stability Control System Based on GPS" and the like all have mentioned this kind additional yaw torque algorithm. Wherein, the sliding mode variable structure control algorithm is used relatively frequently, and many foreigner research the sliding mode variable structure control, e.g., the articles of Drakunow, et. al (2000), Gematsu and Gerdes (2002), Yi, et. al (2003), Yoshioka, et. al (1998), Slotine, Li (1991) and others introduce the sliding mode variable structure control algorithm in detail. This control method has the advantage of satisfying nonlinearity, time-varying property and uncertainty of the system.

In FIG. 2 and the following formulas, each letter means as followed:

m - - - vehicle mass;
$k_f$, $k_r$ - - - cornering stiffness of front and rear axles;
$\delta_f$ - - - front wheel turning angle;
$I_z$ - - - rotational inertia of the vehicle around the Z axis;
$l_f$, $l_r$ - - - distance from the front and rear axle of the vehicle to the mass center of the vehicle;
$V_x$ - - - longitudinal speed;
$V_y$ - - - lateral speed;
$\gamma_r$, $\dot{\gamma}$, $\gamma_d$ - - - yaw angle speed, yaw angle acceleration, and ideal yaw angle speed;
$\beta$ - - - mass center rolling angle;
$F_{yf}$, $F_{yr}$ - - - lateral force of the front wheel, and lateral force of the rear wheel of the vehicle;
$M_{RSC}$ - - - additional yaw torque.

When building the model, the influence of the steering system, the effect of the suspension, the effect of air power and the cornering characteristic of tires are ignored, it is considered that the speed of the vehicle along the axis is unchangeable and there are only two degrees of freedom of yawing motion around axis and lateral motion, thus, the actual vehicle is simplified into a two-wheel 2-DOF vehicle model. The kinetic equations of the two-degree-of-freedom vehicle model obtained according to Newton's laws of motion are as follows.

The Y-axis component of the absolute acceleration of the mass center of the vehicle is:

$$a_y = \dot{v}_y + v_x \gamma \tag{1}$$

The resultant force along the Y axis is:

$$m(\dot{v}_y + v_x \gamma) = F_{yf} \cos \delta_f + F_{yr} \tag{2}$$

The torque around the mass center is:

$$I_z \dot{\gamma} = l_f F_{yf} \cos \delta_f - l_r F_{yr} \tag{3}$$

In order to maintain the body, the additional yaw torque is $M_{RSC}$, and the torque equilibrium equation around the mass center at the moment is:

$$I_z \dot{\gamma} = l_f F_{yf} \cos \delta_f - l_r F_{yr} + M_{RSC} \tag{4}$$

The lateral forces of the front and rear wheels are:

$$F_{yf} = k_f \alpha_f = k_f \left( \delta_f - \frac{v_y - l_f \gamma}{v_x} \right);$$

$$F_{yr} = k_r \alpha_r = k_r \left( \delta_r - \frac{v_y - l_r \gamma}{v_x} \right).$$

It can be known from formula (3) that the additional yaw torque $M_{RSC}$ can be calculated as long as the yaw angle acceleration $\dot{\gamma}$ is known.

Further analysis is made below.

Figure 3:
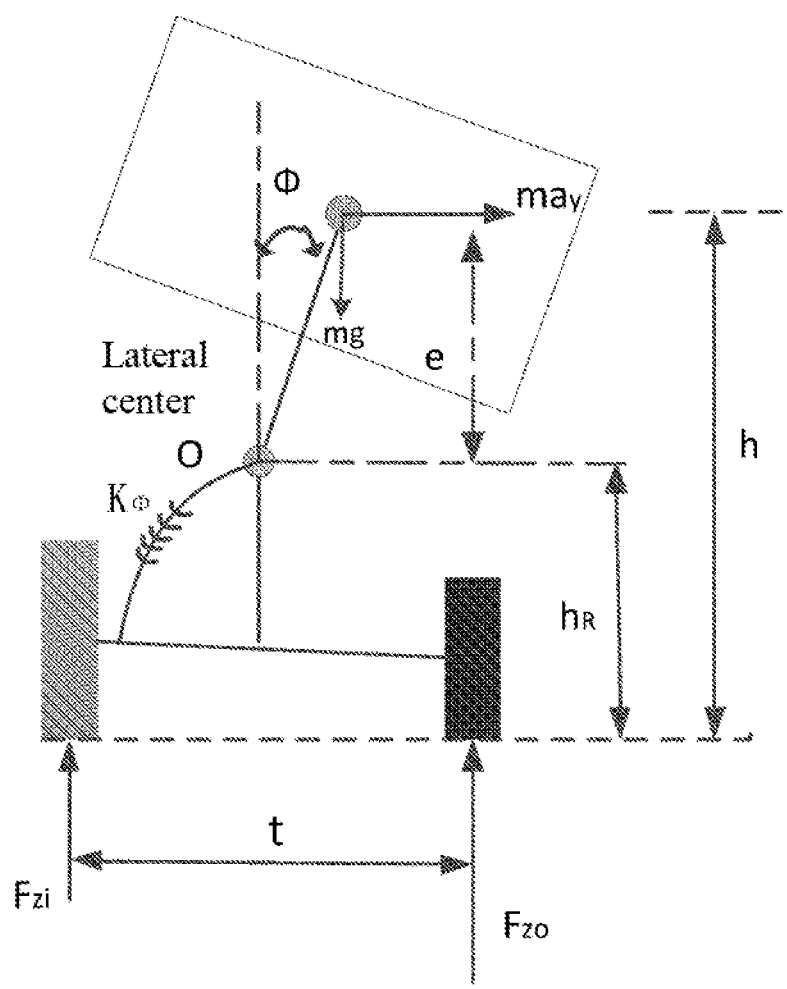
FIG. 3 is a schematic diagram of a force condition when the vehicle rolls in the embodiment of the present application.

Refer to FIG. 3, which expresses a force condition when the vehicle turns left. It is assumed that the sprung mass of the vehicle is equal to the total mass, and the mass center positions of them are same, the following equations can be built to calculate the LTR.

In FIG. 3 and the following formulas, each letter means as followed:

h - - - mass center height;
$h_R$ - - - rolling center height;
e - - - distance between the mass center and the rolling center;
t - - - wheel distance;
a - - - lateral acceleration of the mass center;
$F_{zi}$, $F_{zo}$ - - - vertical load of the inside wheels, vertical load of the outside wheels;
$K_\Phi$ - - - body rolling stiffness.

According to rolling moment equilibrium:

$$K_\Phi - mge\Phi = ma_y e \tag{5}$$

$$(F_{ZO} - F_{zi})\frac{t}{2} mge\Phi = ma_y h \tag{6}$$

The rolling angle can be calculated from formula (5):

$$\Phi = \frac{K_\Phi - ma_y e}{mge} \tag{7}$$

The LTR is:

$$LTR = \frac{F_{ZO} - F_{zi}}{F_{ZO} + F_{zi}}; F_{ZO} + F_{zi} = mg \tag{8}$$

Obtained in combination with formulas (6), (7) and (8) is:

$$LTR = \frac{F_{zo} - F_{zi}}{F_{zo} + F_{zi}} = \frac{2}{t}\left(h\frac{a_y}{g} + e\Phi\right) \tag{9}$$

It can be seen from formula (9) that LTR is directly related to the lateral acceleration and the rolling angle, and the LTR decreases when the lateral acceleration or the rolling angle decreases. Before the additional yaw torque $M_{RSC}$ for keeping the vehicle stable is calculated, the threshold $LTR_d$ of the lateral load transfer ratio and the lateral acceleration threshold $a_{yd}$, i.e., the desired lateral load transfer ratio and lateral acceleration, are determined first, in which $LTR_d$ =0.5 and $a_{yd}$=0.4 g, and the desired $LTR_d$ and $a_{yd}$ are substituted into formula (9) to obtain:

$$a_{yd} = \left(\frac{LTR_d * t}{2} - e\Phi\right)\frac{g}{h} \tag{10}$$

If there is a desired speed $v_{xd}$, according to a kinematic relation, in combination with formula (1), the ideal lateral acceleration of the vehicle can be expressed as:

$$a_{yd} = \dot{v}_y + v_{xd}\gamma_d \quad (11)$$

$\gamma_d$ is the ideal yaw angle speed, which is obtained according to formulas (10) and (11):

$$\gamma_d = \frac{\left(\frac{LTR_{d*t}}{2} - e\Phi\right)\frac{g}{h} - \dot{v}_y}{v_{xd}} \quad (12)$$

A sliding mode controller is designed according to the 2-DOF vehicle model. The mass center rolling angle and the yaw angle speed should be simultaneously considered while a stability control target is selected. A switching function for defining the sliding mode control is:

$$s = \gamma - \gamma_d + \zeta(\beta - \beta_d) \quad (13)$$

In which $\zeta$ is a constant.
Derived from s:

$$\dot{s} = \dot{\gamma} - \dot{\gamma}_d + \zeta(\dot{\beta} - \dot{\beta}_d) \quad (14)$$

When the state quantity arrives at the sliding mode surface, the system trends to be stable, $s = \dot{s} = 0$, i.e., $$\dot{s} = \dot{\gamma} - \dot{\gamma}_d + \zeta(\dot{\beta} - \dot{\beta}_d) = 0$$

Obtained from formula (4) is:

$$\dot{\gamma} = \frac{1}{I_z}(l_f F_{yf}\cos\delta_f - l_r F_{yr} + M_{RSC}) \quad (15)$$

$\dot{\gamma} = \dot{\gamma}_d - \zeta(\dot{\beta} - \dot{\beta}_d)$ is substituted into formula (15) to obtain:

$$\dot{s} = \frac{1}{I_z}(l_f F_{yf}\cos\delta_f - l_r F_{yr} + M_{RSC}) - \dot{\gamma}_d + \zeta(\dot{\beta} - \dot{\beta}_d) = 0 \quad (16)$$

The additional yaw torque $M_{RSC}$ can be solved from formula (16):

$$M_{RSC} = l_f F_{yf}\cos\delta_f + l_r F_{yr} + I_z(\dot{\gamma}_d - \zeta(\dot{\beta} - \dot{\beta}_d)) \quad (17)$$

In which $$\gamma_d = \frac{\left(\frac{LTR_{d*t}}{2} - e\Phi\right)\frac{g}{h} - \dot{v}_y}{v_{xd}};$$

$$\beta_d = \frac{l_r - m*l_f*v_x^2/(k_r*L)}{L(1 + Kv_x^2)}\delta_f,$$

L is the vehicle axle distance;
Stability factor $$K = \frac{m}{L^2}\left(\frac{l_f}{k_r} - \frac{l_r}{k_f}\right).$$

In formula (17), $l_f$ and $l_r$ are vehicle parameters which are respectively the distance from the front and rear axle of the vehicle to the mass center of the vehicle. The lateral forces $F_{yf}$ and $F_{yr}$ of the front and rear wheels are calculated from the supplementary formulas below formula (4). $\delta_f$ is the front wheel turning angle which can be solved by detecting steering wheel angle signals via the steering wheel angle sensor and calculating from the ratio of the steering wheel angle to the front wheel turning angle. $I_z$ is the rotational inertia of the whole vehicle around the Z axis and is a constant value when the vehicle is manufactured.

$\dot{\gamma}_d$ is an ideal yaw angle acceleration, the (desired) ideal yaw angle speed $$\gamma_d = \frac{\left(\frac{LTR_{d*t}}{2} - e\Phi\right)\frac{g}{h} - \dot{v}_y}{v_{xd}},$$

namely formula (12), can be obtained in combination with formula (10)

$$a_{yd} = \left(\frac{LTR_{d*t}}{2} - e\Phi\right)\frac{g}{h}$$

and formula (11) $a_{yd} = \dot{v}_y + v_{xd}\gamma_d$, and $$\dot{\gamma}_d = \frac{\left(\frac{LTR_{d*t}}{2} - e\Phi\right)\frac{g}{h} - \ddot{v}_y}{v_{xd}}$$

can be obtained by derivation, in which the denominator is the ideal (desired) speed, which can be obtained by solving the wheel speeds of four wheels from the wheel speed signals detected by the wheel speed sensors 11 and selecting the average value of them. It should be pointed out, the stability control system 100 of this embodiment further includes four motor resolver sensors 10 which detect the rotational speed signals of the corresponding motors 6. The first stability control unit can also calculate the ideal vehicle speed according to the rotational speed signals of the motors. Moreover, the wheel speed sensors and the resolver sensors can verify each other, which has the advantage that if one set of sensors fails, the other set of sensors can be used as the judgment basis of the first stability control unit, so that the accuracy of calculating the vehicle speed is improved. Of course, the ideal vehicle speed can also be solved by other algorithms.

$LTR_d$ is the expected lateral load transfer ratio, and can be set on its own, e.g., set to 0.5. t is wheel distance, and e is the distance between the mass center and the rolling center; $\Phi$ is a body rolling angle, $$\dot{\Phi} = \frac{K_\Phi - m\dot{a}_y e}{mge},$$

and $K_\Phi$ is body rolling stiffness.
It can be known from the above, $\dot{\gamma}_d$ can be solved as long as $\dot{a}_y$ and $\ddot{v}_y$ are known, in which $a_y$ is a component of the absolute acceleration of the vehicle mass center on the longitudinal axis Y, $a_y = \dot{v}_y + v_x\gamma$, namely $\dot{a}_y = \ddot{v}_y + \dot{v}_x\gamma$, in which $\dot{a}_y$ indicates the change rate of the component of the absolute acceleration of the vehicle mass center on the longitudinal axis Y, and $\ddot{v}_y$ indicates the change rate of the lateral acceleration $\dot{v}_y$ of the body, in which both the lateral acceleration $\dot{v}_y$ of the body and the longitudinal acceleration $\dot{v}_x$ of the body can be directly read via the acceleration sensor.

Further, for the change rate $\ddot{v}_y$ of the lateral acceleration, the value of the lateral acceleration of $\dot{v}_y$ the body is numerical processed, so that the change rate $\ddot{v}_y$ of the lateral acceleration of the body is calculated indirectly. The value of the lateral acceleration $\dot{v}_y$ of the body is fitted into a linear function $\dot{v}_y=k_1t+k_2$ to time t by using matlab, in which $k_1$ and $k_2$ are fitting constants, then $\ddot{v}_y=k_1$ is obtained by deriving the time t and substituted into the formula to obtain the $\dot{a}_y$, and γ is read from the yaw angle speed sensor, so that $\dot{\gamma}_d$ is obtained.

Next, ζ is a constant, β is a mass center rolling angle and can be measured by a GPS device, β is zero after derivation, the ideal mass center rolling angle $β_d$ can be obtained by deriving $β_d$ below formula (17), $$\beta_d = \frac{l_r - m*l_f*v_x^2/(k_r*L)}{L(1+Kv_x^2)} \delta_f,$$

in which the $β_d$ is derived by using the vehicle speed $v_x$ as a variable and others as constants. The formula of the derived $\dot{β}$ includes vehicle speed $v_x$ and longitudinal acceleration, in which the vehicle speed $v_x$ can be acquired from the vehicle speed signals detected by the vehicle speed sensor 5A, and the longitudinal acceleration is acquired from the longitudinal acceleration signals detected by the longitudinal acceleration sensor. $v_x$ is the component of the whole vehicle speed in the X direction (longitudinal direction), and the component of the whole vehicle speed in the Y direction (horizontal direction) is very small relative to the vehicle speed in the X direction (longitudinal direction) and can be ignored, so the magnitude of the vehicle speed $v_x$ in the X direction (longitudinal direction) is substantially equal to the magnitude of the whole vehicle speed and can be detected by using the vehicle speed sensor 5A.

It can be known from the above that the additional yaw torque $M_{RSC}$ can be calculated as long as steering wheel angles signals, wheel speed signals, vehicle speed signals, lateral acceleration signals, longitudinal acceleration signals and yaw angle speed signals are detected.

After the additional yaw torque $M_{RSC}$ is obtained, the first stability control unit judges to apply braking force whether to the outside front wheel or to the outside front wheel and the inside rear wheel according to the magnitude of the lateral load transfer ratio LTR. For the specific judgment basis, a reference is made to table 2.

TABLE 2

| | Judgment basis | | |
|---|---|---|---|
| Lateral acceleration | Lateral load transfer ratio | Vehicle state | Wheel side motor control |
| $a_y \geq a_{yd}$ | |LTR| < L1 | Normal, having sideslip trend | (ESP control) |
| | L1 ≤ |LTR| ≤ L2 | The body tilts slightly, having rollover trend | Outside front wheel braked |
| | L2 ≤ |LTR| ≤ L3 | The body tilts seriously, having rollover risk | Outside front wheel braked; Inside rear wheel braked |

In this embodiment, as an example, the preset acceleration threshold $a_{yd}$ is 0.4 g, the first transfer ratio threshold L1 is 0.5, the second transfer ratio threshold L2 is 0.6 and the third transfer ratio threshold L3 is 0.9.

When |LTR|<0.5, the vehicle load is transferred a little, but rollover risk does not happen, and the vehicle only has a sideslip trend. The second stability control unit (ESP) controls the body of the electric vehicle to keep stable, e.g., the second stability control unit can brake the corresponding wheel 9 by controlling the brake of the electric vehicle to reduce sideslip so as to keep the body of the vehicle stable, and the first stability control unit does not need to start the motor controllers 6 to control the motors 2, i.e., at the moment, the first stability control unit does not interfere with the wheel 9.

When 0.5≤|LTR|<0.6, it is at an electric vehicle rollover pre-warning stage, the loads of the left and right wheels are transferred partially, the body rolls over and has a rollover trend, and the first stability control unit is triggered. The first stability control unit judges that the electric vehicle has a rollover trend, and calculates the additional yaw torque according to the acquired sensor signals and the preset lateral load transfer ratio to apply braking force to the outside front wheel, in which the magnitude of the braking force is $F1=M_{RSC}/R_1$, in which F1 is the braking force applied to the outside front wheel, $M_{RSC}$ is the additional yaw torque, and $R_1$ is the tire rolling radius of the outside front wheel. Thereafter, the first stability control unit sends a first braking force signal to the motor controller 2 corresponding to the outside front wheel according to the magnitude of the braking force, and the motor controller 2 controls the motor 6 according to the first braking force signal to apply braking force to the outside front wheel. Thus, the vehicle produces certain yaw torque to correct the posture of the body, and is maintained to drive stably.

When 0.6≤|LTR|≤0.9, the left and right wheels of the vehicle have serious load transfer, the body seriously tilts outward (e.g., rollover caused by suddenly turning the steering wheel at a high speed or by lateral wind, wherein no matter the steering wheel is turned left or right, the body tilts outward), the inside wheels having the loads reduced cannot provide sufficient ground braking force, and the vertical load $F_{zi}$ of the inside wheels is reduced. If the maximum ground braking force provided by the outside wheels is $$F_{zo}*\mu < \frac{M_{RSC}}{R1},$$

the first stability control unit judges that the outside front wheel cannot provide corresponding ground braking force, in which μ is a road adhesion coefficient, during calculation, μ is a constant value and can be designed according to the parameters before the vehicle leaves the factory, and $F_{zo}$ is the vertical load of the outside wheel.

Thus, on the one hand, the first stability control unit applies braking force $F1'=F_{zo}*\mu$ to the outside front wheel via the motor controller 2.

On the other hand, the first stability control unit controls the corresponding motor 6 via the motor controller 2 to apply braking force to the inside wheel which should be the inside rear wheel according to the statistical result of braking each wheel at certain turning angle in table 1, and the magnitude of the applied braking force is $$F2 = \frac{M_{RSC}}{R1} - F_{zo}*\mu,$$

in which F2 is the braking force applied to the inside rear wheel by the motor. Thus, the first stability control unit enables the outside front wheel and the inside rear wheel to collectively form a reasonable yaw torque, the LTR is reduced to the desired LTR, and then the whole vehicle is maintained to drive stably.

Thus, the first stability control unit sends a second braking force signal to the motor controller 2 corresponding to the outside front wheel and the motor controller 2 corresponding to the inside rear wheel, so that the motor controllers 2 control the corresponding motors 6 to apply braking force to the outside front wheel and the inside rear wheel.

A stability control process when the vehicle urgently avoids an obstacle ahead or the steering wheel is turned suddenly while the vehicle is driving straight on a highway will be analyzed below in combination with an example.

Figure 4:
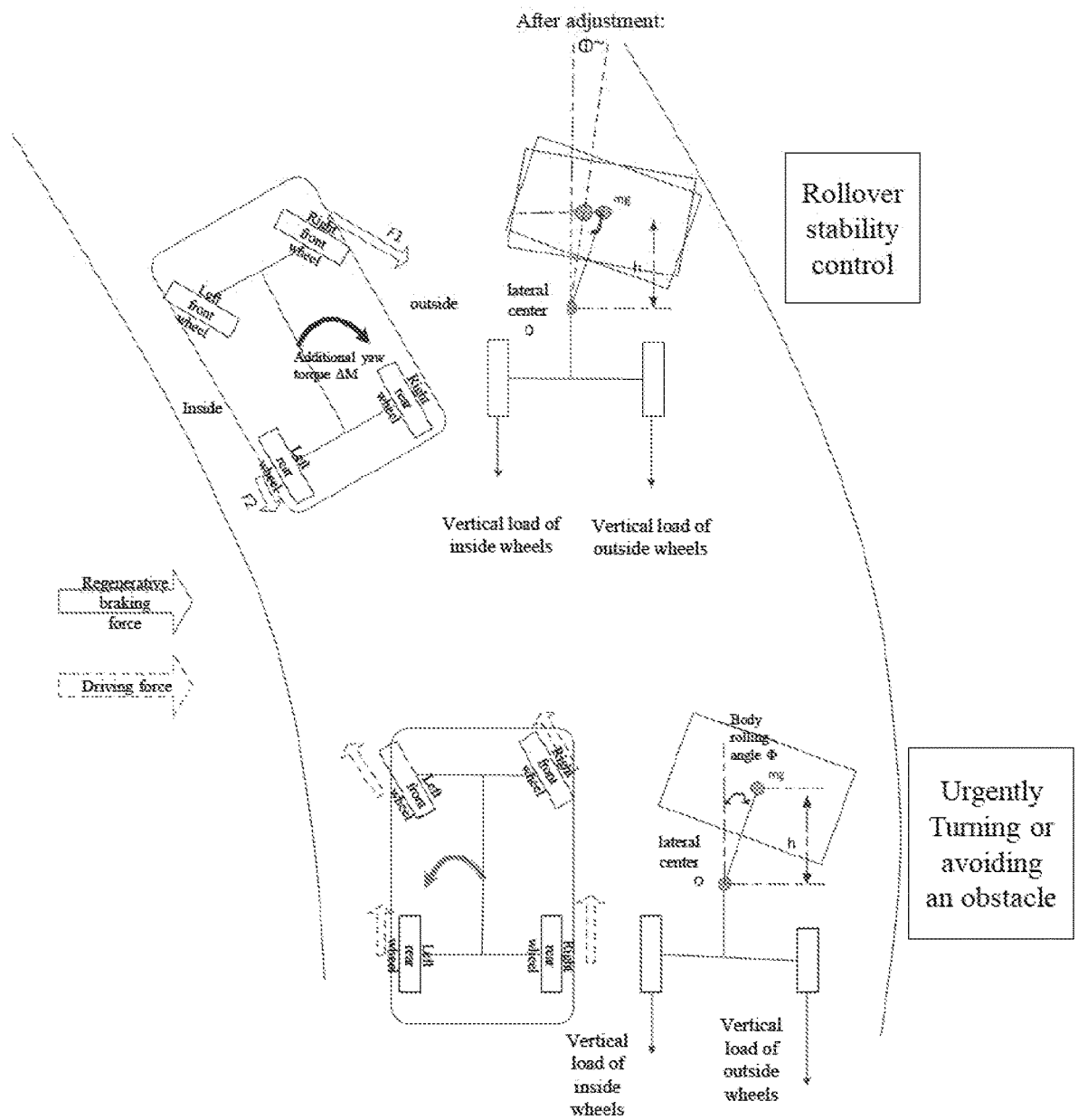
FIG. 4 is a schematic diagram of a stability control process when the vehicle urgently avoids an obstacle ahead or the steering wheel is turned suddenly in the embodiment of the present application.
Figure 5:
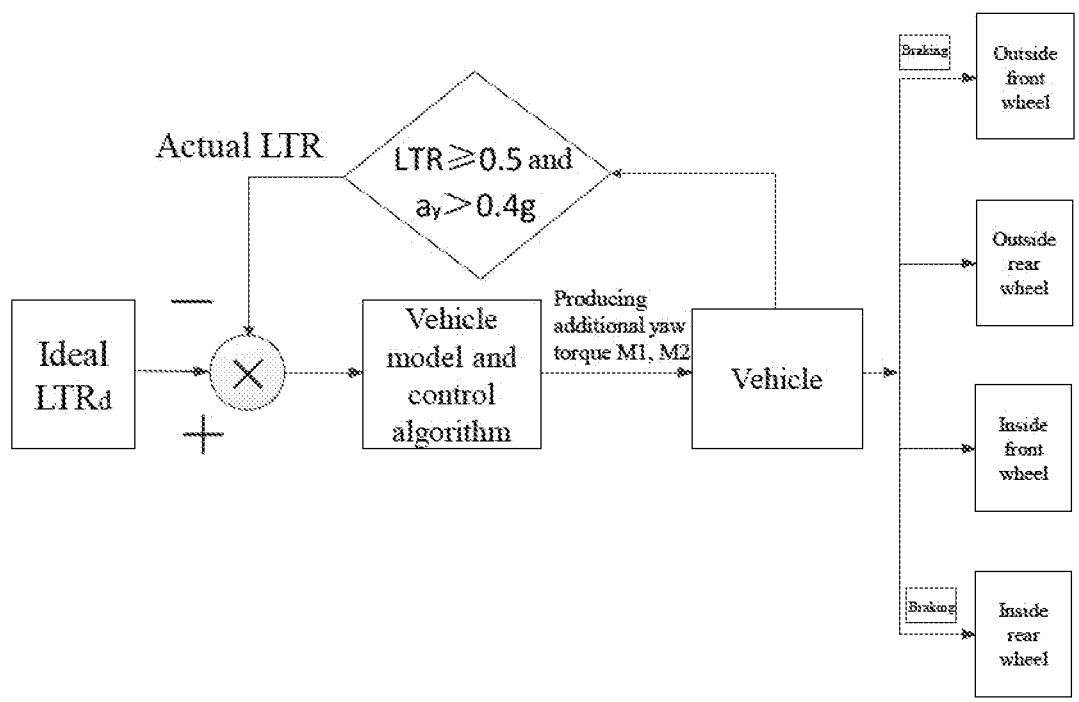
FIG. 5 is a control principle diagram of the stability control system for the four-wheel drive electric vehicle according to the embodiment of the present application.

Referring to FIGS. 4 and 5, FIG. 4 is a schematic diagram of a stability control process when the vehicle urgently avoids an obstacle ahead or the steering wheel is turned suddenly, and FIG. 5 is a principle diagram of stability control.

During the high-speed driving of the vehicle, if the vehicle suddenly encounters an obstacle ahead, and the driver rapidly turns the steering wheel in the emergency avoidance process, the first stability control unit calculates the LTR in real time according to the signals of the steering wheel angle sensor 3, the yaw rate sensor 5, the vehicle speed sensor 5A and the wheel speed sensors 11 (or resolver sensors 10).

The first stability control unit sets the lateral acceleration threshold to 0.4 g, the first transfer ratio threshold LTR1=0.5, the second transfer ratio threshold LTR2=0.6 and the third transfer ratio threshold LTR3=0.9.

When the vehicle turns at a medium-high speed or at a small angle so that 0.5≤|LTR|<0.6, the first stability control unit calculates the additional yaw torque c in real time by using the vehicle model and the corresponding control algorithm, and applies braking force to the outside front wheel via the motor controller 2 and the wheel side motor 6 in the mode of regenerative braking, so that |LTR| returns to no more than 0.5.

When the vehicle turns at a high speed or at an urgent large turning angle so that 0.6≤|LTR|≤0.9, the first stability control unit calculates the additional yaw torque $M_{RSC}'$ in real time by using the vehicle model and the corresponding control algorithm, and applies braking force to the outside front wheel and the inside rear wheel via the motor controllers 2 and the wheel side motors 6 in the mode of regenerative braking. Thus, the outside front wheel, while regenerative braking, assists the inside rear wheel in regenerative braking to form a stronger differential torque, reduce the yaw angle speed and lateral acceleration, timely correct the rollover posture of the body and reduce the LTR value, so that the vehicle is maintained to run stable.

To sum up, in said stability control system 100, the first stability control unit takes corresponding vehicle stable measures according to different states of the vehicle, particularly, when the vehicle has a rollover trend or risk, the first stability control unit can apply braking force to the outside front wheel of the vehicle, or apply braking force to the outside front wheel and the inside rear wheel of the vehicle, to keep the body stable.

Figure 6:
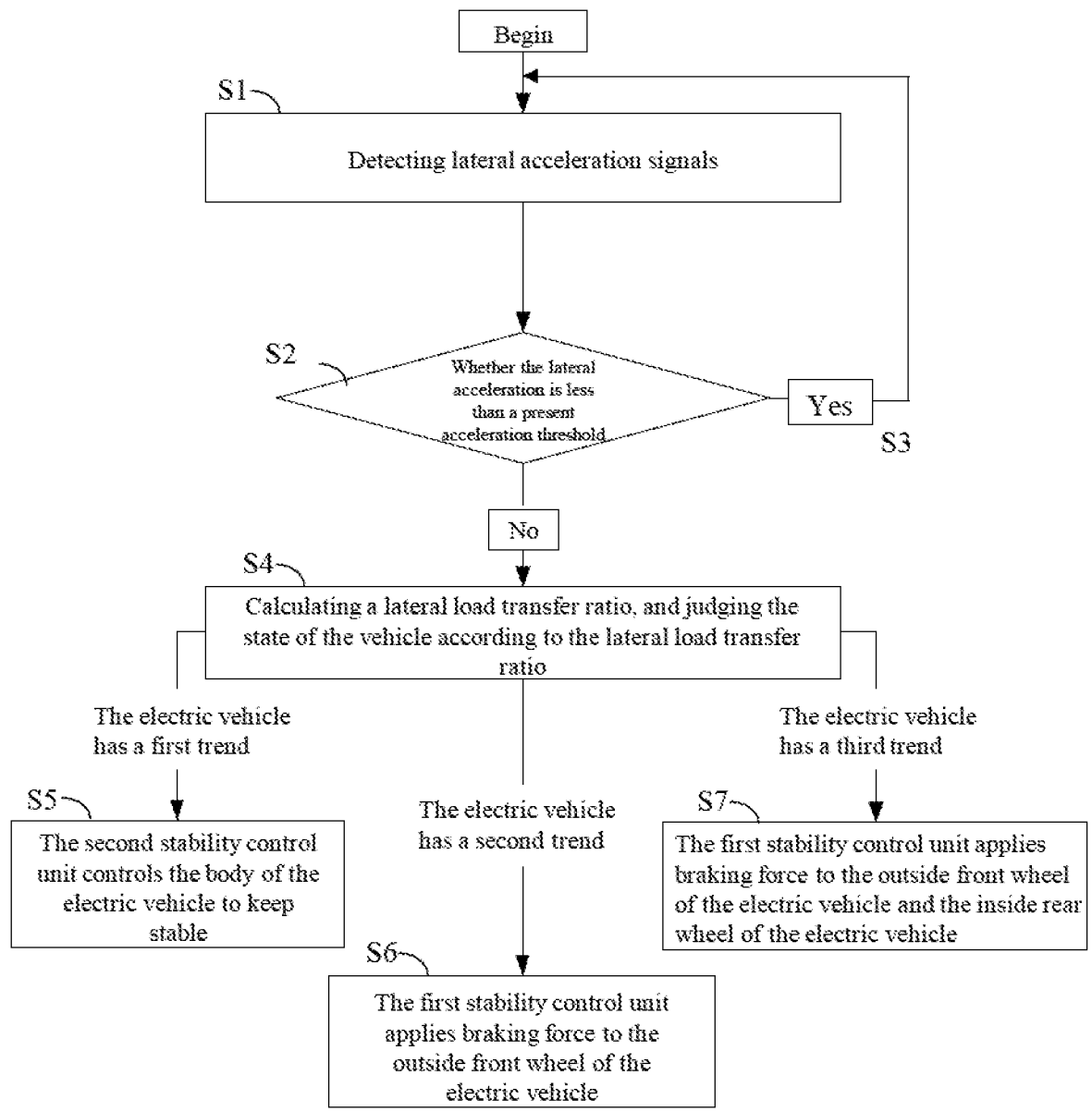
FIG. 6 is a flow diagram of a stability control method for a four-wheel drive electric vehicle according to the embodiment of the present application.

As shown in FIG. 6, an embodiment of the present application provides a stability control method for a four-wheel drive electric vehicle (hereinafter referred to as a stability control method). The stability control method can be realized by the stability control system 100 of the above embodiment.

In an embodiment, the stability control method includes:

S1: the signal detection sensor detects lateral acceleration signals.

S2: the first stability control unit judges whether the lateral acceleration is less than a preset acceleration threshold.

S3: if the lateral acceleration is less than the acceleration threshold, it returns to S1.

S4: if the lateral acceleration is equal to or greater than the acceleration threshold, the first stability control unit calculates a lateral load transfer ratio according to the lateral acceleration signals, and judges the state of the vehicle according to the lateral load transfer ratio to obtain at least one of a first braking force signal, a second braking force signal, a first logic signal and a second logic signal.

S5: if the first logic signal is obtained, the second stability control unit controls the body of the electric vehicle to keep stable.

S6: if the first braking force signal and the second logic signal are obtained, the first stability control unit controls the motor through the motor controller to apply braking force to the outside front wheel of the electric vehicle.

S7: if the second braking force signal and the second logic signal are obtained, the first stability control unit controls the motors via the motor controllers to apply braking force to the outside front wheel of the electric vehicle and the inside rear wheel of the electric vehicle.

In S1, the yaw rate sensor 5 of the signal detection sensor detects the lateral acceleration signals. Besides, the signal detection sensor includes wheel speed sensors, a vehicle speed sensor, a steering wheel angle sensor and the yaw rate sensor. The wheel speed sensors are used for detecting the wheel speed signals. The vehicle speed sensor is used for detecting the vehicle speed signals. The steering wheel angle sensor is used for detecting steering wheel angle sensor signals. The yaw rate sensor is further used for detecting the yaw angle speed signals and the longitudinal acceleration signals for subsequent calculation.

In S2, the preset acceleration threshold is 0.4 g in this embodiment.

In S4, when the lateral acceleration is equal to or greater than the acceleration threshold, the first stability control unit calculates the lateral load transfer ratio as a basis for vehicle state judgment. Further, a first transfer ratio threshold, a second transfer ratio threshold and a third transfer ratio threshold are preset in the first stability control unit. The first transfer ratio threshold is greater than zero, the second transfer ratio threshold is greater than the first transfer ratio threshold, and the third transfer ratio threshold is greater than the second transfer ratio threshold and less than 1.

If |LTR|<L1, the first logic signal is obtained, and the first stability control unit determines that the electric vehicle has a first trend, e.g., the electric vehicle has a sideslip trend.

If L1≤|LTR|<L2, the first braking force signal and the second logic signal are obtained, and the first stability control unit judges that the electric vehicle has a second trend, e.g., the electric vehicle has a rollover trend.

If L2≤|LTR|≤L3, the second braking force signal and the second logic signal are obtained, and the first stability control unit judges that the electric vehicle has a third trend, e.g., the electric vehicle has a rollover risk.

In which, LTR indicates the lateral load transfer ratio, |LTR| indicates the absolute value of the lateral load transfer ratio, L1 indicates the first transfer ratio threshold, L2 indicates the second transfer ratio threshold, and L3 indicates the third transfer ratio threshold.

In this embodiment, L1=0.5, L2=0.6, and L3=0.9.

In S5, the vehicle has a sideslip trend, and for example, the second stability control unit can brake the corresponding wheel 9 by controlling a brake (not shown in the figure) of the electric vehicle, to reduce sideslip so as to keep the body of the vehicle stable.

In S6, the vehicle has a rollover trend, the first stability control unit calculates the additional yaw torque according to the above acquired sensor signals (wheel speed signals, vehicle speed signals, steering wheel angle signals, yaw angle speed signals, longitudinal acceleration signals and lateral acceleration signals) and the preset lateral load transfer ratio, to apply braking force to the outside front wheel, in which the magnitude of the braking force is $F1=M_{RSC}/R_1$, in which F1 is the braking force applied to the outside front wheel, $M_{RSC}$ is the additional yaw torque, and $R_1$ is the tire rolling radius of the outside front wheel. Thereafter, the first stability control unit sends a first braking force signal to the motor controller 2 corresponding to the outside front wheel according to the magnitude of the braking force, and the motor controller 2 controls the motor 6 according to the first braking force signal to apply braking force to the outside front wheel. Thus, the vehicle produces certain yaw torque to correct the posture of the body, and is maintained to drive stably.

In S7, the vehicle has a rollover risk, and on the one hand, the first stability control unit applies braking force $F1=M_{RSC}/R_1$ to the outside front wheel via the motor controller 2.

On the other hand, the first stability control unit controls the corresponding motor 6 via the motor controller 2 to apply braking force to the inside wheel which should be the inside rear wheel according to the statistical result of braking each wheel at certain turning angle in table 1, and the magnitude of the applied braking force is $$F2 = \frac{M_{RSC}}{R2} - F_{zi} * \mu,$$

in which F2 is the braking force applied to the inside rear wheel by the motor, $M_{RSC}$ is the additional yaw torque, $R_2$ is the rolling radius of the inside rear wheel, $F_{zi}$ is the vertical load of the inside wheel, and $\mu$ is the road adhesion coefficient. Thus, the first stability control unit enables the outside front wheel and the inside rear wheel to collectively form a reasonable yaw torque, the LTR is reduced to the desired LTR, and then the whole vehicle is maintained to drive stably.

Thus, the first stability control unit sends a second braking force signal to the motor controller 2 corresponding to the outside front wheel and the motor controller 2 corresponding to the inside rear wheel, and the motor controllers 2 control the corresponding motors 6 to apply braking force to the outside front wheel and the inside rear wheel.

For other parts not described in the stability control method of this embodiment, a reference may be made to the corresponding parts of the stability control system 100 of the above embodiment, which is not described in detail herein.

To sum up, in said stability control method, the first stability control unit takes corresponding vehicle stable measures according to different states of the vehicle, particularly, when the vehicle has a rollover trend or risk, the first stability control unit can apply braking force to the outside front wheel of the vehicle, or apply braking force to the outside front wheel and the inside rear wheel of the vehicle, to keep the body stable.

An embodiment of the present application provides a four-wheel drive electric vehicle. The electric vehicle includes the above mentioned stability control system 100 for the four-wheel drive electric vehicle, motor controllers and motors, in which the motor controllers are connected with the motors and the stability control system respectively. Thus, the first stability control unit of the electric vehicle takes corresponding vehicle stable measures according to different states of the vehicle, particularly, when the vehicle has a rollover trend or risk, the first stability control unit can apply braking force to the outside front wheel of the vehicle, or apply braking force to the outside front wheel and the inside rear wheel of the vehicle, to keep the body stable.

In the description of this specification, the descriptions of reference terms "one embodiment", "some embodiments", "schematic embodiment", "example", "specific example", or "some examples" and the like mean that the specific features, structures, materials or characteristics described in combination with the embodiments or examples are included in at least one embodiment or example of the present application. In the specification, the schematic expression of said terms may not necessarily indicate the same embodiment or example. Moreover, the described specific features, structures, materials or characteristics can be appropriately combined in one or more embodiments or examples.

Moreover, the terms "first" and "second" are merely for the sake of description, but cannot be understood as indicating or hinting the relative importance or implying the quantity of the indicated technical features. Thus, the features defined with "first" and "second" may explicitly or implicitly include at least one of the features. In the description of the present application, "multiple" means at least two, e.g., two, three, etc., unless otherwise specified.

The description of any process or method described in the flow diagram or in other ways herein may be understood as a module, a fragment or a part expressing a code of an executable instruction including one or more steps for realizing specific logic functions or processes, and the scope of the preferred embodiments of the present application includes additional implementation, wherein the functions may not be executed according to the shown or discussed sequence, including substantially simultaneous manner or opposite sequence, which should be understood by those skilled in the art of the embodiments of the present application.

Logics and/or steps expressed in the flow diagrams or described herein in other ways, for example, can be considered as a sequencing table of executable instructions for realizing logical functions, and can be embodied in any computer-readable medium, and used by an instruction execution system, device or equipment (e.g., a computer-based system, a processor-containing system, or other system that can extract an instruction from the instruction execution system, device or equipment and execute the instruction), or used in combination with the instruction execution system, device or equipment. In terms of this specification, the "computer-readable medium" may be any device that can include, store, communicate, propagate or transport programs used by the instruction execution system, device or equipment or used in combination with the instruction execution system, device or equipment. The computer-readable medium in more specific examples (a non-exhaustive list) includes: an electrical connection part (electronic device) having one or more wires, a portable computer disk cartridge (magnetic device), a random access memory (RAM), a read-only memory (ROM), an erasable programmable read-only memory (EPROM or flash memory), an optical fiber device, and a portable compact disc read-only memory (CDROM). In addition, the computer-readable medium even can be paper or other appropriate medium on which said programs are printed, for example, said programs can be obtained in an electronic mode by optically scanning paper or other medium and then editing, interpreting or processing it in other appropriate mode, and then the programs are stored in a computer memory.

It should be understood that all parts of the present application can be realized via hardware, software, firmware or a combination thereof. In the above embodiments, multiple steps or methods can be implemented by software or firmware that is stored in a memory and executed by a proper instruction execution system. For example, if they are implemented by hardware, as in another embodiment, they can be implemented by using one of the following technologies known in the art or a combination thereof: a discrete logic circuit with a logic gate circuit for realizing logic functions on data signals, a dedicated integrated circuit with an appropriate combined logic gate circuit, a programmable gate array (PGA), a field programmable gate array (FPGA), etc.

It could be understood by those of ordinary skill in the art that all of or part of steps of the method of the above embodiment can be implemented by instructing relevant hardware via a program, the program can be stored in a computer-readable storage medium, and when the program is executed, one of the steps of the method embodiment or their combination is executed.

Moreover, the functional units in the embodiments of the present application may be integrated in one processing module, or the units separately and physically exist, or two or more units are integrated in one module. The above-mentioned integrated module may be realized in the form of hardware or a software functional module. When the integrated module is realized in the form of a software functional module and sold or used as an independent product, it can also be stored in a computer-readable storage medium.

The aforementioned storage medium may be a read-only memory, a magnetic disc or an optical disc, etc. Although the embodiments of the present application are shown and described above, it could be understood that said embodiments are exemplary and cannot be understood as limiting the present application. Changes, modifications, substitutions and variations could be made to the embodiments by those of ordinary skilled in the art within the scope of the present application.

The invention claimed is:

1. A stability control system for a four-wheel drive electric vehicle, comprising:
    a vehicle controller and a signal detection sensor, wherein the vehicle controller comprises a first stability control unit and a second stability control unit;
    the signal detection sensor is configured to detect lateral acceleration signals;
    the first stability control unit is configured to continuously determine whether a lateral acceleration is less than a preset lateral acceleration threshold, until the lateral acceleration is equal to or greater than the preset lateral acceleration threshold;
    the first stability control unit is further configured to calculate a lateral load transfer ratio according to the lateral acceleration signals when the lateral acceleration is equal to or greater than the preset lateral acceleration threshold, and to determine a state of the vehicle according to the lateral load transfer ratio to obtain at least one of a first braking force signal, a second braking force signal, a first logic signal and a second logic signal;
    the second stability control unit is configured to control the body of the electric vehicle to keep stable when obtaining the first logic signal;
    the first stability control unit is further configured to control a motor of the electric vehicle via a motor controller of the electric vehicle to apply braking force to an outside front wheel of the electric vehicle when obtaining the first braking force signal and the second logic signal; and
    the first stability control unit is further configured to control motors of the electric vehicle via motor controllers of the electric vehicle to apply braking force to the outside front wheel of the electric vehicle and an inside rear wheel of the electric vehicle when obtaining the second braking force signal and the second logic signal.

2. The stability control system according to claim 1, wherein
    the first stability control unit is configured to:
        obtain the first logic signal to determine that the electric vehicle has a first trend when $|LTR|<L1$;
        obtain the first braking force signal and the second logic signal to determine that the electric vehicle has a second trend when $L1 \leq |LTR| < L2$;
        obtain the second braking force signal and the second logic signal to determine that the electric vehicle has a third trend when $L2 \leq |LTR| \leq L3$;
        wherein LTR is the lateral load transfer ratio, $|LTR|$ indicates the absolute value of the lateral load transfer ratio, L1 is the first transfer ratio threshold, L2 is the second transfer ratio threshold, L3 is the third transfer ratio threshold, the first transfer ratio threshold is greater than zero, the second transfer ratio threshold is greater than the first transfer ratio threshold, and the third transfer ratio threshold is greater than the second transfer ratio threshold and less than 1.

3. The stability control system according to claim 1, wherein the first stability control unit is configured to:
    when obtaining the first braking force signal, determine braking force applied to the outside front wheel according to the following formula:

$$F1 = M_{RSC}/R_1,$$

wherein F1 is the braking force applied to the outside front wheel, $M_{RSC}$ is an additional yaw torque, and $R_1$ is a tire rolling radius of the outside front wheel.

4. The stability control system according to claim 1, wherein the first stability control unit is configured to:
    when obtaining the second braking force signal, determine braking force applied to the outside front wheel according to the following formula:

$$F1' = F_{zo} * \mu,$$

wherein F1' is the braking force applied to the outside front wheel, $\mu$ is a road adhesion coefficient, and $F_{zo}$ is the vertical load of the outside wheel; and
    determine braking force applied to the inside rear wheel according to the following formula:

$$F2 = M_{RSC}/R_1 - F_{zo} * \mu,$$

wherein F2 is the braking force applied to the inside rear wheel, $M_{RSC}$ is an additional yaw torque, and $R_1$ is a tire rolling radius of the outside front wheel.

5. The stability control system according to claim 3, wherein
the signal detection sensor is configured to detect wheel speed signals, vehicle speed signals, steering wheel angle signals, yaw angle speed signals and longitudinal acceleration signals;
the first stability control unit is further configured to calculate the additional yaw torque according to the wheel speed signals, the vehicle speed signals, the steering wheel angle signals, the yaw angle speed signals, the longitudinal acceleration signals, the lateral acceleration signals and the preset lateral load transfer ratio.

6. The stability control system according to claim 5, wherein the signal detection sensor comprise wheel speed sensors, a vehicle speed sensor, a steering wheel angle sensor and a yaw rate sensor;
the wheel speed sensors are configured to detect the wheel speed signals;
the vehicle speed sensor is configured to detect the vehicle speed signals;
the steering wheel angle sensor is configured to detect the steering wheel angle signals; and
the yaw rate sensor is configured to detect the yaw angle speed signals, the longitudinal acceleration signals and the lateral acceleration signals.

7. A stability control method for a four-wheel drive electric vehicle, comprising:
detecting lateral acceleration signals, by a signal detection sensor;
continuously determining whether a lateral acceleration is less than a preset lateral acceleration threshold, until the lateral acceleration is equal to or greater than the preset lateral acceleration threshold;
calculating a lateral load transfer ratio according to the lateral acceleration signals, and determining a state of the vehicle according to the lateral load transfer ratio to obtain at least one of a first braking force signal, a second braking force signal, a first logic signal and a second logic signal when the lateral acceleration is equal to or greater than the preset lateral acceleration threshold;
controlling the body of the electric vehicle to keep stable when the first logic signal is obtained;
controlling a motor of the electric vehicle to apply braking force to an outside front wheel of the electric vehicle when the first braking force signal and the second logic signal are obtained; and
controlling motors of the electric vehicle to apply braking force to the outside front wheel of the electric vehicle and an inside rear wheel of the electric vehicle when the second braking force signal and the second logic signal are obtained.

8. The stability control method according to claim 7, wherein
the step of determining the state of the vehicle according to the lateral load transfer ratio to obtain at least one of a first braking force signal, a second braking force signal, a first logic signal and a second logic signal comprises:
obtaining the first logic signal to determine that the electric vehicle has a first trend when $|LTR|<L1$;
obtaining the first braking force signal and the second logic signal to determine that the electric vehicle has a second trend when $L1 \leq |LTR| < L2$;
obtaining the second braking force signal and the second logic signal to determine that the electric vehicle has a third trend when $L2 \leq |LTR| \leq L3$;
wherein LTR is the lateral load transfer ratio, |LTR| is the absolute value of the lateral load transfer ratio, L1 is the first transfer ratio threshold, L2 is the second transfer ratio threshold, and L3 is the third transfer ratio threshold.

9. The stability control method according to claim 7, wherein further comprising:
when obtaining the first braking force signal, determining braking force applied to the outside front wheel according to the following formula:

$$F1 = M_{RSC}/R_1,$$

wherein F1 is the braking force applied to the outside front wheel, $M_{RSC}$ is an additional yaw torque, and $R_1$ is a tire rolling radius of the outside front wheel.

10. The stability control method according to claim 7, further comprising:
when obtaining the second braking force signal, determining braking force applied to the outside front wheel according to the following formula:

$$F1' = F_{zo} * \mu,$$

wherein F1' is the braking force applied to the outside front wheel, $\mu$ is a road adhesion coefficient, and $F_{zo}$ is the vertical load of the outside wheel; and
determining braking force applied to the inside rear wheel according to the following formula:

$$F2 = M_{RSC}/R_1 - F_{zo} * \mu,$$

wherein F2 is the braking force applied to the inside rear wheel, $M_{RSC}$ is an additional yaw torque, and $R_1$ is a tire rolling radius of the outside front wheel.

11. The stability control method according to claim 9, wherein further comprising:
detecting wheel speed signals, vehicle speed signals, steering wheel angle signals, yaw angle speed signals and longitudinal acceleration signals; and
calculating the additional yaw torque according to the wheel speed signals, vehicle speed signals, steering wheel angle signals, yaw angle speed signals, longitudinal acceleration signals, lateral acceleration signals and the preset lateral load transfer ratio.

12. The stability control method according to claim 11, wherein
the signal detection sensor comprises wheel speed sensors, a vehicle speed sensor, a steering wheel angle sensor and a yaw rate sensor;
the step of detecting wheel speed signals, vehicle speed signals, steering wheel angle signals, yaw angle speed signals and longitudinal acceleration signals comprises:
detecting wheel speed signals via the wheel speed sensors, detecting vehicle speed signals via the vehicle speed sensor, detecting steering wheel angle signals via the steering wheel angle sensor, and detecting yaw angle speed signals, longitudinal acceleration signals and lateral acceleration signals via the yaw rate sensor.

13. A four-wheel drive electric vehicle, comprising:
the stability control system according to claim 1;
motor controllers; and
motors, wherein the motor controllers are connected with the motors and the stability control system respectively.

14. The stability control system according to claim 2, wherein the first stability control unit is configured to:
when obtaining the first braking force signal, determine braking force applied to the outside front wheel according to the following formula:

$$F1=M_{RSC}/R_1,$$

wherein F1 is the braking force applied to the outside front wheel, $M_{RSC}$ is an additional yaw torque, and $R_1$ is a tire rolling radius of the outside front wheel.

15. The stability control system according to claim 2, wherein the first stability control unit is configured to:
when obtaining the second braking force signal, determine braking force applied to the outside front wheel according to the following formula:

$$F1'=F_{zo}*\mu,$$

wherein F1' is the braking force applied to the outside front wheel, $\mu$ is a road adhesion coefficient, and $F_{zo}$ is the vertical load of the outside wheel; and
determine braking force applied to the inside rear wheel according to the following formula:

$$F2=M_{RSC}/R_1-F_{zo}*\mu,$$

wherein F2 is the braking force applied to the inside rear wheel, $M_{RSC}$ is an additional yaw torque, and $R_1$ is a tire rolling radius of the outside front wheel.

16. The stability control system according to claim 4, wherein
the signal detection sensor is configured to detect wheel speed signals, vehicle speed signals, steering wheel angle signals, yaw angle speed signals and longitudinal acceleration signals;
the first stability control unit is further configured to calculate the additional yaw torque according to the wheel speed signals, vehicle speed signals, steering wheel angle signals, yaw angle speed signals, longitudinal acceleration signals, lateral acceleration signals and the preset lateral load transfer ratio.

17. The stability control system according to claim 15, wherein
the signal detection sensor is configured to detect wheel speed signals, vehicle speed signals, steering wheel angle signals, yaw angle speed signals and longitudinal acceleration signals;
the first stability control unit is further configured to calculate the additional yaw torque according to the wheel speed signals, vehicle speed signals, steering wheel angle signals, yaw angle speed signals, longitudinal acceleration signals, lateral acceleration signals and the preset lateral load transfer ratio.

18. The stability control method according to claim 8, wherein further comprising:
when obtaining the first braking force signal, determining braking force applied to the outside front wheel according to the following formula:

$$F1=M_{RSC}/R_1,$$

wherein F1 is the braking force applied to the outside front wheel, $M_{RSC}$ is an additional yaw torque, and $R_1$ is a tire rolling radius of the outside front wheel.

19. The stability control method according to claim 8, further comprising:
when obtaining the second braking force signal, determining braking force applied to the outside front wheel according to the following formula:

$$F1'=F_{zo}*\mu,$$

wherein F1' is the braking force applied to the outside front wheel, $\mu$ is a road adhesion coefficient, and $F_{zo}$ is the vertical load of the outside wheel; and
determining braking force applied to the inside rear wheel according to the following formula:

$$F2=M_{RSC}/R_1-F_{zo}*\mu,$$

wherein F2 is the braking force applied to the inside rear wheel, $M_{RSC}$ is an additional yaw torque, and $R_1$ is a tire rolling radius of the outside front wheel.

20. The stability control method according to claim 10, wherein further comprising:
detecting wheel speed signals, vehicle speed signals, steering wheel angle signals, yaw angle speed signals and longitudinal acceleration signals; and
calculating the additional yaw torque according to the wheel speed signals, vehicle speed signals, steering wheel angle signals, yaw angle speed signals, longitudinal acceleration signals, lateral acceleration signals and the preset lateral load transfer ratio.

* * * * *